(No Model.)
E. MERCIER.
FOOT REST FOR BICYCLES.
No. 585,963. Patented July 6, 1897.
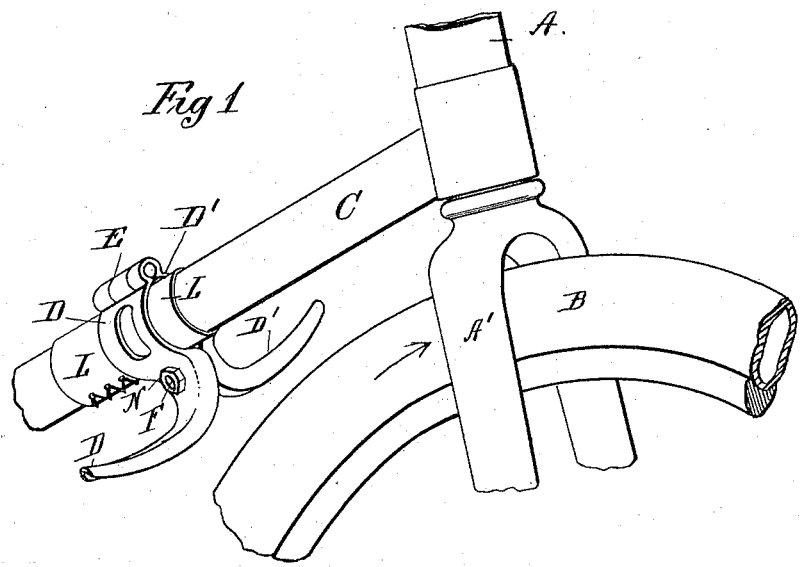
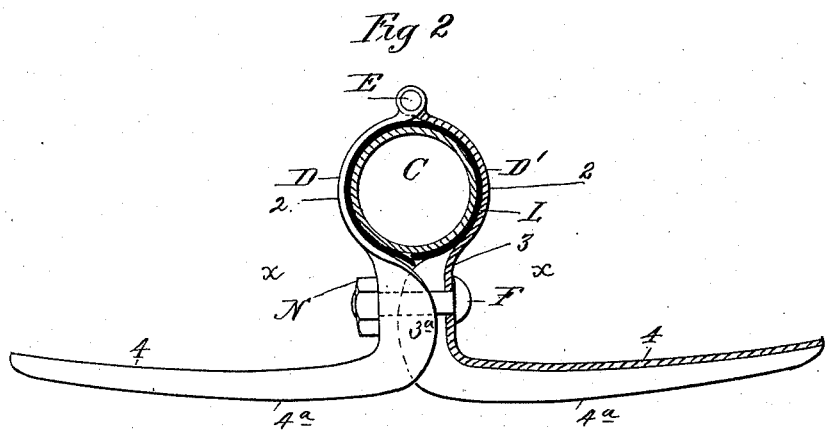
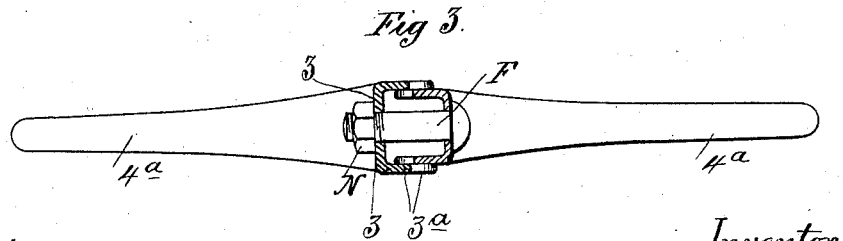
Witnesses.
K. J. Clemons
Chas. B. Cooke.
Inventor
Edward Mercier
by Chapin & Co.
Attys.

UNITED STATES PATENT OFFICE.

EDWARD MERCIER, OF SPRINGFIELD, MASSACHUSETTS.

FOOT-REST FOR BICYCLES.

SPECIFICATION forming part of Letters Patent No. 585,963, dated July 6, 1897.

Application filed August 10, 1896. Serial No. 602,276. (No model.)

*To all whom it may concern:*

Be it known that I, EDWARD MERCIER, a citizen of the United States of America, residing at Springfield, in the county of Hampden and State of Massachusetts, have invented new and useful Improvements in Foot-Rests for Bicycles, of which the following is a specification.

This invention relates to bicycles, and particularly to foot-rests or "coasters" therefor, the object of the invention being to provide a removable or adjustable foot-rest for the rider; and it consists in the construction thereof, as fully set forth in the specification and particularly pointed out in the claims.

In the drawings forming part of this specification, Figure 1 is a perspective view of a part of a bicycle, showing the improved foot-rest applied thereto. Fig. 2 shows a front elevation of the foot-rest, partly in section, applied to a part of a bicycle-frame, also in section. Fig. 3 is a sectional plan view of the foot-rest, taken on line $x\ x$, Fig. 2.

Referring to the drawings, A is the head of a bicycle-frame; A', the fork; B, a portion of the front wheel, and C the lower front brace or tube running from the lower end of the head A to the crank-hanger.

The foot-rest, which is the subject of this invention, is constructed for attachment to the part C of the frame of a bicycle instead of, as usual, to the fork A'. The purpose of applying this foot-rest to a fixed part of the frame is, primarily, to have the feet of the rider in such position when on the rest that the toes of the shoes can be applied to the tire of the front wheel as a brake, and, secondarily, to bring the feet and legs of the rider further under the body than is possible with the foot-rest on the fork of the machine in order to lessen the danger of being thrown if in coasting the machine should run over any obstruction in the road. With the legs well back under the rider a much firmer seat is maintained in the saddle, and, furthermore, with the front wheel under the sole control of the handle-bar the bicycle is much more perfectly under control than with the weight of the feet on the fork, as is the case when the foot-rests are applied thereto.

In using the foot as a brake it is necessary, in order to avoid being thrown by a too sudden application of the foot to the tire of the wheel behind the fork, that great care should be used, and by affording a rest for the foot, as herein shown and described, such pressure as is necessary to stop the bicycle may be applied without danger, as the weight of the foot is sustained by the foot-rest and the danger of having the toe of the shoe drawn in between the tire and the under side of the crown of the fork is entirely avoided, as the heel of the shoe bears against the side of the foot-rest, securely holding it against forward motion of the wheel. The said foot-rest is preferably made of suitable sheet metal by stamping and consists of two parts D D', hinged together at E. Said parts D D' are each provided with a semicircular or semitubular portion 2 2 for encircling the tube C of the bicycle-frame and oppositely-located vertical portions 3 3, through which a bolt F passes, a nut N thereon serving to clamp the said two parts D D' tightly around the said tube. Substantially at right angles to said two vertical parts 3 3 the parts 4 4 extend in opposite directions and of such length as is necessary to provide a secure rest for the foot on each side of the tube C. Said parts 4 4 curve upward slightly, as shown in the drawings. The parts 3 3 and 4 4 of D and D' are provided with the flanges $3^a\ 3^a$ and $4^a\ 4^a$, which are substantially at right angles to the said parts 3 3 and 4 4, thereby giving great rigidity thereto and yet providing a construction of the lightness requisite in all bicycle constructions.

As shown in the drawings, more especially in Figs. 2 and 3, the part 3 of D' is made narrower than the similar part of D, and the flanges $3^a\ 3^a$ thereof fit more or less closely within said part D when the device is clamped onto a bicycle-frame. This construction adds greatly to the stiffness of the parts D D' at the point where the greatest strain is applied when the device is in use.

A piece of rubber L or other suitable material is interposed between the inner surfaces of the parts D D' and the tube C of the bicycle to prevent the abrasion of the latter when the foot-rest is clamped thereon. This protective piece L may be cemented to the inner surfaces of the parts 2 2 of D D' and is made long enough so that it projects beyond one end thereof, as at $o$, and this end is preferably provided with a lacing o' for tying it down closely to the tube C, the purpose of the said projecting piece o being to prevent the chafing of the enameled tube C by the friction of the shoe of the rider when the feet are on the foot-rests.

Having thus described my invention, what I claim, and desire to secure by Letters Patent, is—

1. As a new article of manufacture, a stamped-up foot-rest for bicycles, consisting of two parts pivoted together, and each part provided with outwardly-extending rests, combined with a clamping-screw for securing the two parts together upon the bicycle-frame; each part being provided with vertical flanges, the flanges of one part being made to fit snugly within those of the other at that point where the bolt passes through them, substantially as shown.

2. A struck-up foot-rest for a bicycle, consisting of two parts which are hinged together, each part being flat and curved where it comes in contact with the frame of the bicycle, straight at that part where they come in contact with each other and provided with vertical flanges, and having their lower ends turned outwardly and made concavo-convex, combined with a clamping-bolt which secures the two parts together and forces the flanges of one part tightly within those of the other, substantially as described.

EDWARD MERCIER.

Witnesses:
H. A. CHAPIN,
K. I. CLEMONS.